(12) United States Patent
Matsuzaki

(10) Patent No.: US 11,265,447 B2
(45) Date of Patent: Mar. 1, 2022

(54) UTILIZING LUMINANCE VARIATION OF THE WHITE AREA OF THE TONE CHART IN TONE CORRECTION

(71) Applicant: CANON KABUSHIKI KAISHA, Tokyo (JP)

(72) Inventor: Masanori Matsuzaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/319,998

(22) Filed: May 13, 2021

(65) Prior Publication Data

US 2021/0385341 A1   Dec. 9, 2021

(30) Foreign Application Priority Data

Jun. 5, 2020 (JP) .............................. JP2020-098732

(51) Int. Cl.
*H04N 1/60* (2006.01)
*H04N 1/00* (2006.01)
*H04N 1/407* (2006.01)

(52) U.S. Cl.
CPC ....... *H04N 1/6097* (2013.01); *H04N 1/00045* (2013.01); *H04N 1/00087* (2013.01); *H04N 1/4074* (2013.01); *H04N 1/6005* (2013.01); *H04N 1/6008* (2013.01); *H04N 2201/0082* (2013.01)

(58) Field of Classification Search
None
See application file for complete search history.

(56) References Cited

FOREIGN PATENT DOCUMENTS

| JP | 2009147438 A | | 7/2009 |
|---|---|---|---|
| JP | 2013175997 A | * | 9/2013 |

* cited by examiner

*Primary Examiner* — Barbara D Reinier
(74) *Attorney, Agent, or Firm* — Canon U.S.A., Inc. IP Division

(57) ABSTRACT

An image forming apparatus outputs a tone chart for calibration by a printer, reads the output tone chart by a scanner, determines whether data on a sheet is affected by a surface shape of the sheet based on the read tone chart, corrects data on a white area of the read chart based on a result of the determination, and executes calibration using the corrected data.

10 Claims, 14 Drawing Sheets

UTILIZING LUMINANCE VARIATION OF THE WHITE AREA OF THE TONE CHART IN TONE CORRECTION

BACKGROUND

Field of the Disclosure

The present disclosure generally relates to image forming and, more particularly, to an image forming apparatus and a control method of the image forming apparatus.

Description of the Related Art

While recent years have seen the emergence of a machine that achieves image quality equivalent to that of a printing machine along with increased performance of an electrophotographic apparatus, there remains an issue that a color change amount in such a machine is larger than that in the printing machine due to inherent instability of electrophotography.

To address this issue, a "monochromatic color" calibration technique of creating a one-dimensional look-up table (LUT) for tone correction corresponding to toner of each color of cyan, magenta, yellow, and black (hereinafter referred to as C, M, Y, and K, respectively) is implemented in conventional electrophotographic apparatuses. The LUT is a table indicating output data corresponding to input data sectioned at specific intervals, and can express non-linear characteristics that cannot be expressed by an arithmetic expression. The "monochromatic-color" means a color expressed by using single toner for C, M, Y, or K.

In calibration, a dedicated chart for executing correction is output from a printer. The LUT is created by comparing a signal value obtained by reading the output chart by a scanner and a reference target so as to eliminate a difference therebetween.

In the above-mentioned calibration technique, information on a paper white portion (blank portion) of the chart is important because the information serves as a reference in processing. If paper that is not supposed to be used is used at the time of calibration, the accuracy of the processing is decreased due to a change in the reference. To address this issue, Japanese Patent Application Laid-Open No. 2009-147438 discusses a technique of generating a target curve based on a change in the value of the paper white portion and then performing calibration.

According to the technique discussed in Japanese Patent Application Laid-Open No. 2009-147438, however, if erroneous signal values are obtained by a scanner reading the paper white portion, a target curve is generated with the erroneous signal values read from the paper white portion, thereby decreasing the accuracy of correction. Many scanners include a plurality of illumination sources that are arranged to irradiate an original document with light from different angles to prevent the appearance of shadows caused by irregularities in the surface of the original document. However, in a case of a scanner with an illumination source that irradiates an original document from one side, which will be described below, the angle of irradiation is fixed, so that shadows are generated by irregularities in the surface of the original document.

In a case of using "paper with large surface irregularities" in calibration, "shadows" that are not supposed to be present are generated in a paper white portion due to the influence of the surface irregularities. The influence of the shadows changes a signal value of the paper white portion, thereby making it impossible to obtain an intrinsic signal value of the paper white portion that is supposed to be obtained.

As described above, there is an issue that the scanner including an illumination source on one side may erroneously read a signal value from the paper white portion, which can lead to a decrease in the accuracy of calibration.

SUMMARY

According to an aspect of the present disclosure, an image forming apparatus includes an output unit configured to output a tone chart including a white area, a reading unit configured to read the tone chart output by the output unit, a determination unit configured to determine variance of luminance of the white area of the tone chart read by the reading unit, a luminance value correction unit configured to correct a luminance value of the white area of the tone chart read by the reading unit based on a result of the determination made by the determination unit, and a tone correction unit configured to perform tone correction using the luminance value of the white area corrected by the luminance value correction unit.

Further features of the present disclosure will become apparent from the following description of exemplary embodiments with reference to the attached drawings.

DESCRIPTION OF THE EMBODIMENTS

Various exemplary embodiments, features, and aspects to carry out the present disclosure will be described below with reference to the accompanying drawings.

In a first exemplary embodiment, a description will be given of a method of outputting and scanning a chart for calibration and acquiring an average signal value of a paper white portion (white area) of the chart and an average signal value of patches printed on the chart. Furthermore, a description will be given of a method of performing processing of determining whether signal values are influenced by irregularities in the surface of paper, and, if so, correcting the acquired signal values of the paper white portion and highlights.

Figure 1:
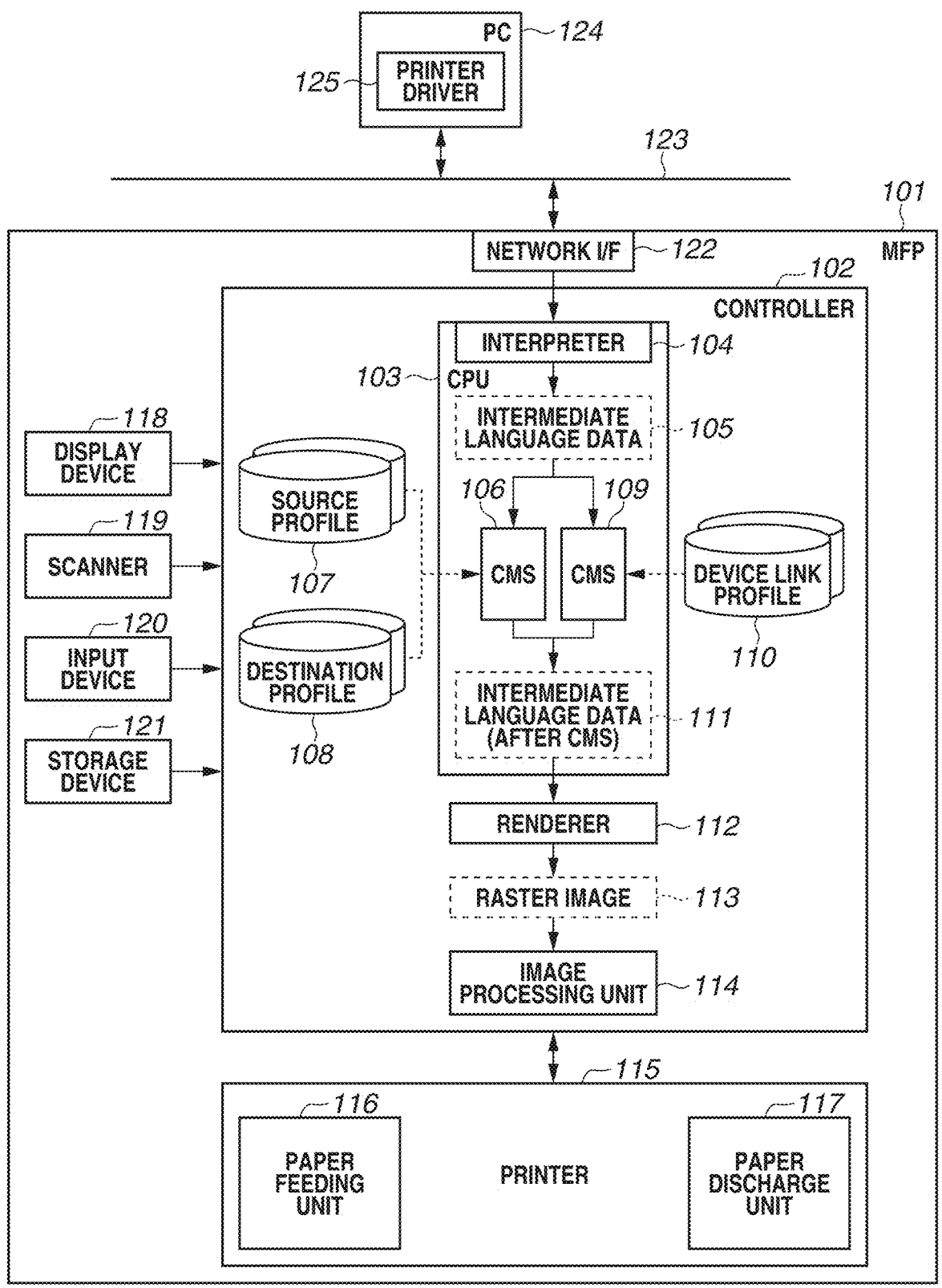
FIG. 1 is a block diagram of a system according to a first exemplary embodiment.

FIG. 1 is a block diagram of a system according to the present exemplary embodiment. A multi-function printer (MFP) 101 using toner of each color of cyan, magenta, yellow, and black (hereinafter referred to as C, M, Y, and K, respectively) is connected to another network-compatible apparatus via a network 123. A personal computer (PC) 124 is connected to the MFP 101 via the network 123. A printer driver 125 in the PC 124 transmits print data to the MFP 101.

The MFP 101, which is an image forming apparatus, according to the present exemplary embodiment will be described in detail below. A network interface (I/F) 122 receives print data and the like. The controller 102 includes a central processing unit (CPU) 103, a renderer 112, and an image processing unit 114. An interpreter 104 of the CPU 103 interprets a page description language (PDL) part of received print data, and generates intermediate language data 105. A color management system (CMS) 106 performs color conversion using a source profile 107 and a destination profile 108, and generates intermediate language data (after CMS) 111. The CMS 106 performs color conversion using profile information, which will be described below. The source profile 107 is a profile for converting a device-dependent color space, such as a red-green-blue (RGB) color space and a CMYK color space, into a device-independent color space such as an L*a*b* (hereinafter referred to as Lab) color space and an XYZ color space which are defined by the International Commission on Illumination (CIE). The XYZ color space is a device-independent color space similarly to the Lab color space, and expresses a color with tristimulus values. The destination profile 108 is a profile for converting the device independent color space into a CMYK color space which is dependent on a device (printer 115).

Meanwhile, a CMS 109 performs color conversion using a device link profile 110, and generates the intermediate language data (after CMS) 111. The device link profile 110 is a profile for directly converting the device-dependent color space, such as an RGB color space and a CMYK color space, into a CMYK color space dependent on the device (printer 115). Which of the CMSs is to be selected depends on a setting in the printer driver 125.

In the present exemplary embodiment, it is determined which of the CMSs (the CMS 106 or the CMS 109) is used depending on a type of a profile (the source profile 107, the destination profile 108, or the device link profile 110), but one CMS may handle a plurality of types of profiles. Types of profiles are not limited to the examples described in the present exemplary embodiment, and may be any types of profiles if the device-dependent CMYK color space that is dependent on the printer 115 is used.

The renderer 112 generates a raster image 113 from the generated intermediate language data (after CMS) 111. The image processing unit 114 performs image processing on the raster image 113 or an image read by a scanner 119. Details of the image processing unit 114 will be described below.

The printer 115 connected to the controller 102 is a printer that forms output data on paper using color toner such as C, M, Y, and K toner. The printer 115 includes a paper feeding unit 116 that feeds paper and a paper discharge unit 117 that discharges paper on which output data is formed.

A display device 118 is a user interface (UI) that displays an instruction to a user and a state of the MFP 101. The display device 118 is used at the time of execution of calibration, which will be described below.

The scanner 119 includes an auto document feeder. The scanner 119 causes a light source to irradiate a bundle of original images or one sheet of an original image with light, and forms an original reflected image on a solid-state imaging device such as a sensor. The scanner 119 then obtains image reading signals in raster format as image data from the solid-state imaging device. Details of the scanner 119 will be described below.

An input device 120 is an interface to accept an input from a user. Part of the input device 120 serves as a touch panel and is thus integrated with the display device 118.

A storage device 121 stores therein data processed by the controller 102, data received by the controller 102, and the like.

Figure 2:
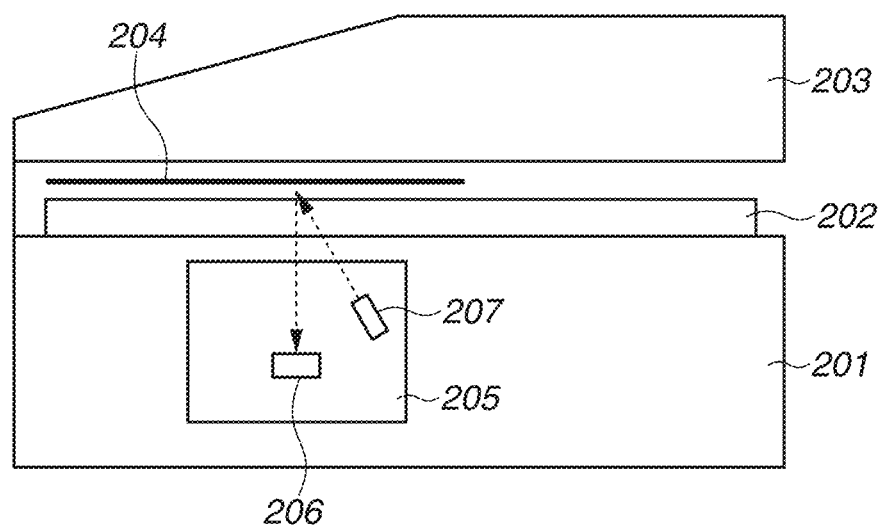
FIG. 2 is a block diagram of a scanner including one light source according to the first exemplary embodiment.

Subsequently, the scanner 119 will be described with reference to FIG. 2. A document positioning plate 201 incorporates a reading device 205. The reading device 205 incorporates a light source 207 and a solid-state imaging device 206, causes the light source 207 to irradiate paper 204 with light through a glass plate 202, and acquires image reading signals in a raster format. The light source 207 can emit three types of light, i.e., red light, green light, and blue light (hereinafter referred to as R light, G light, and B light, respectively). The solid-state imaging device 206 acquires respective image data of R, G, and B from the corresponding types of light emitted by the light source 207.

An auto document feeder 203 is capable of feeding a plurality of sheets of the paper 204 one by one. Meanwhile, the auto document feeder 203 is also capable of retaining the paper 204 placed on the glass plate 202 as illustrated in FIG. 2.

Figure 14:
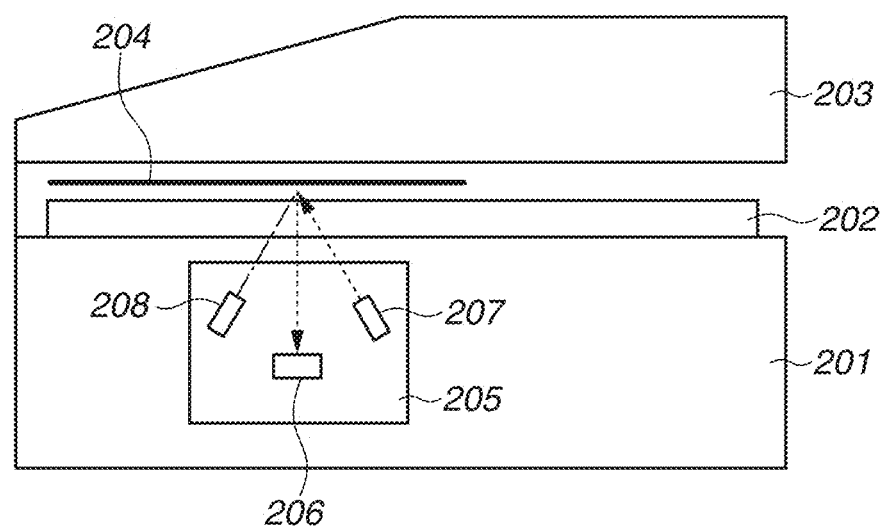
FIG. 14 is a block diagram of a scanner including two light sources.

The light source 207 of the scanner 119 emits light from only one direction. Hence, in a case where the original document has irregularities in the surface thereof, a portion with the irregularities may be reproduced as a shadow. As illustrated in FIG. 14, arranging another light source 208 in the opposite direction of the light source 207 can eliminate the shadow, which, however, poses an issue of increased costs.

In a case where the paper has the irregularities in the surface thereof, shadows may be reproduced even in a blank portion. In addition, in a case where the light source 207 includes a plurality of light sources for R, G, and B, the irradiation angles of the R, G and B light sources differ due to the difference of installation positions of the light sources, and reproducibility of the shadows may differ depending on colors.

Figure 8A:
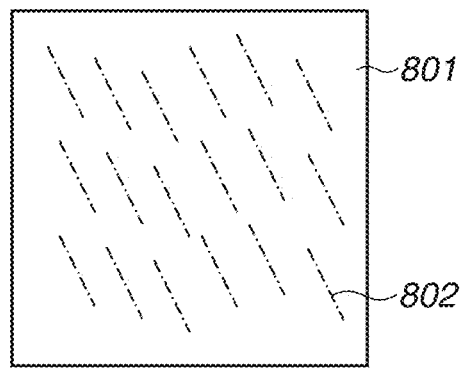
FIGS. 8A and 8B are diagrams each illustrating an example of a scanned image of a blank portion according to the first exemplary embodiment.
Figure 8B:
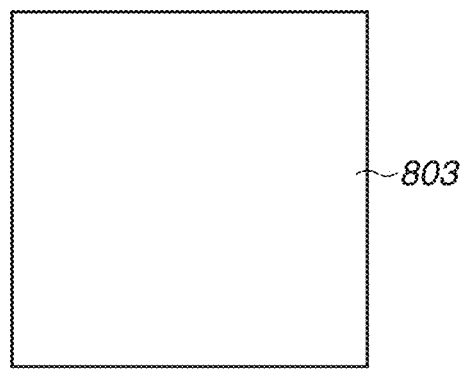

FIGS. 8A and 8B each illustrate an example where a blank portion of paper is reproduced. FIG. 8A illustrates an example of data 801 that is obtained by scanning the blank portion of the paper with a light source of the scanner 119. Since the paper has visually unrecognizable irregularities in the surface thereof, shadows 802 are generated. In contrast, FIG. 8B illustrates an example of data 803 that is obtained by scanning the blank portion of the paper with another light source of the scanner 119. Since the irradiation angle of the light source changes, shadows may not be generated even if the paper has the irregularities in the surface thereof. In a case where the shadows 802 are generated, an average signal value of the blank portion changes due to the influence of the shadows 802, thereby decreasing accuracy of calibration processing. The present exemplary embodiment is directed to a technique of preventing a decrease in accuracy of calibration by shadows that are generated when illumination comes from only one direction (one side).

Figure 3:
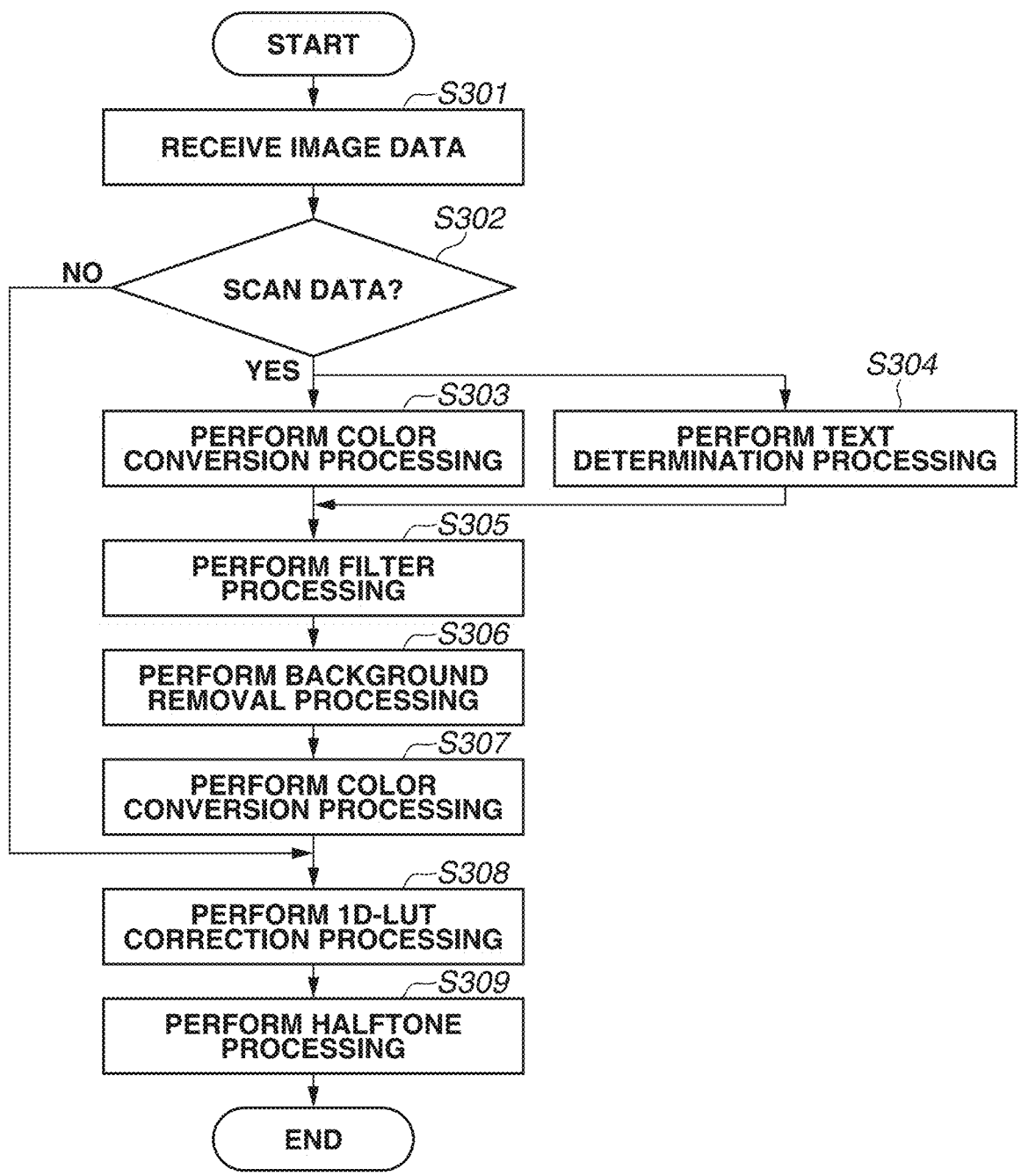
FIG. 3 is a flowchart of image processing according to the first exemplary embodiment.

Subsequently, the flow of processing of the image processing unit 114 will be described with reference to FIG. 3. FIG. 3 illustrates the flow of image processing performed on the raster image 113 or an image read by the scanner 119.

The flow of processing in steps S301 to S309 is implemented by the image processing unit 114 executing the processing based on an instruction from the CPU 103. A program for implementing a flowchart illustrated in FIG. 3 is stored in the storage device 121. The program is loaded into a random-access memory (RAM) (not illustrated) and executed by the CPU 103.

In step S301, the image processing unit 114 receives image data. In step S302, the image processing unit 114 determines whether the received data is scan data received from the scanner 119 or the raster image 113 transmitted from the printer driver 125.

In a case where the data is not the scan data (NO in step S302), the processing proceeds to step S308. In this case, the data is the raster image 113 rasterized as a bitmap format image by the renderer 112, and the image processing unit 114 performs processing in step S308 and a subsequent step on the raster image 113 as a CMYK image obtained by the CMS converting the color space thereof into a CMYK color space dependent on the printer device.

In a case where the data is the scan data (YES in step S302), the processing proceeds to step S303. In step S303, the image processing unit 114 performs color conversion processing because the scan data is an RGB image, and generates a common RGB image. The common RGB image mentioned herein is defined by a RGB color space that does not depend on the device and can be converted into an image defined by a device independent color space, such as a Lab color space or the like, by performing an arithmetic operation.

In step S304, at the same time, the image processing unit 114 performs text determination processing and generates text determination data. The text determination data mentioned herein is data obtained by detecting edges in the image. In step S305, the image processing unit 114 performs filter processing on the common RGB image using the text determination data. In this processing, the image processing unit 114 performs different types of filter processing on a text portion and portions other than the text portion using the text determination data. In step S306, the image processing unit 114 performs background removal processing on the image. In step S307, the image processing unit 114 performs color conversion processing on the image to generate a CMYK image in which a background is removed.

In step S308, the image processing unit 114 corrects tone characteristics of each of the colors C, M, Y, and K using a one-dimensional look-up table (1D-LUT). The 1D-LUT mentioned herein is the one-dimensional look-up table for correcting each color of C, M, Y, and K, and is generated by "calibration processing", which will be described below. In step S309, the image processing unit 114 performs halftone processing, such as screen processing and error-diffusion processing, to generate a binary CMYK image.

Figure 4:
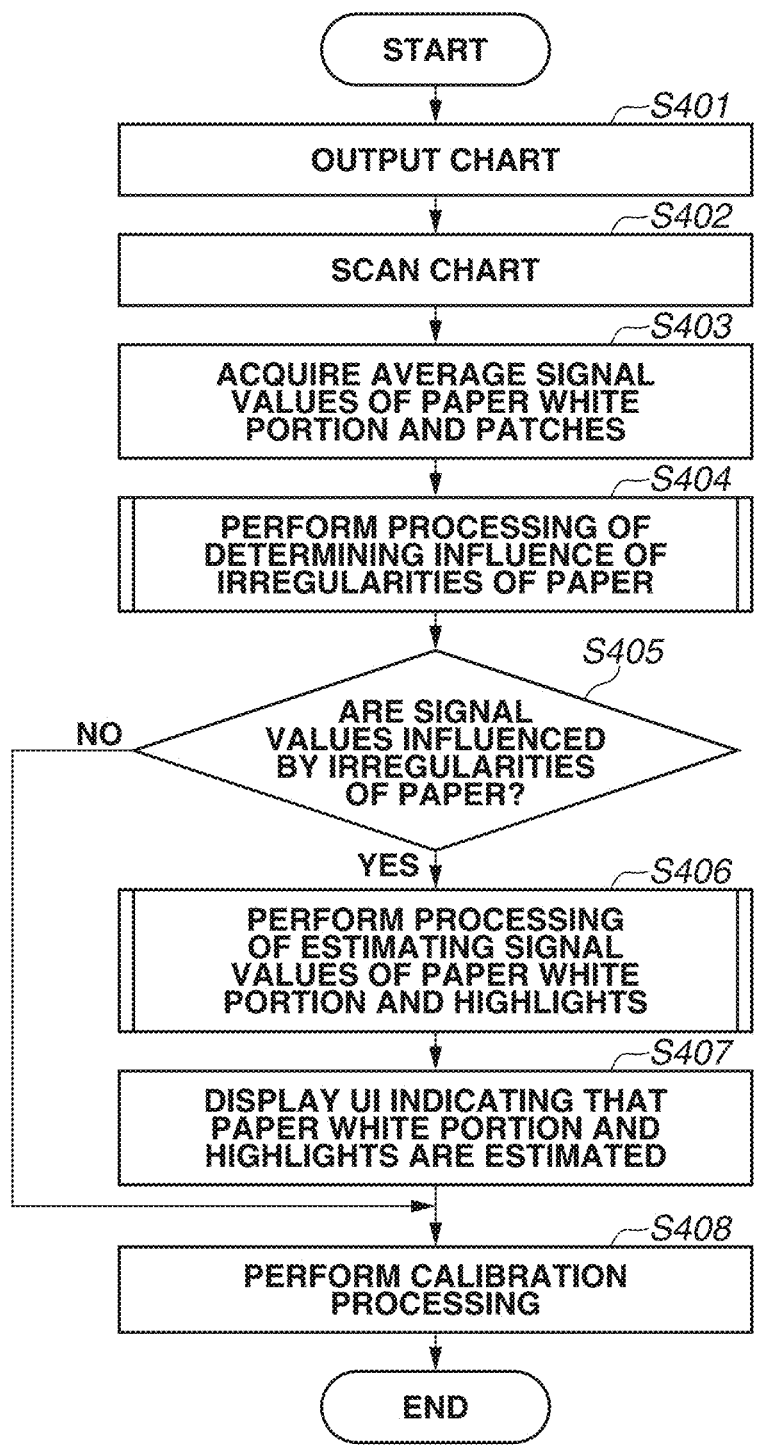
FIG. 4 is a flowchart of calibration processing according to the first exemplary embodiment.

FIG. 4 is a diagram illustrating the flow of calibration processing according to the present exemplary embodiment. The flow of the following processing is implemented by the CPU 103 included in the controller 102, and the 1D-LUT generated by the calibration processing is stored in the storage device 121. A program for implementing the flow-chart illustrated in FIG. 4 is stored in the storage device 121, loaded into the RAM (not illustrated), and executed by the CPU 103. The display device 118 displays an instruction to the user on a UI and accepts a user's instruction from the input device 120.

In step S401, the printer 115 outputs a tone chart based on control of the CPU 103 included in the controller 102. The tone chart will be described below. In step S402, the scanner 119 reads (scans) the output tone chart based on control of the CPU 103 included in the controller 102. The flow of the processing in steps S403 to S408 is implemented by the CPU 103 included in the controller 102.

In step S403, the CPU 103 acquires an average signal value of a paper white portion (white area) and an average signal value of patches of the scanned chart data. In step S404, the CPU 103 performs processing of determining influence of surface irregularities of paper. That is, in step S404, the CPU 103 determines variance of signal values (luminance) of the paper white portion and patches of the chart data. Details of the processing of determining the influence of the surface irregularities of the paper will be described below.

In step S405, the CPU 103 determines whether signal values are influenced by the surface irregularities of the paper. In a case where the signal values are influenced by the surface irregularities (YES in step S405), the processing proceeds to step S406. In step S406, the CPU 103 performs processing of estimating signal values of the paper white portion and highlights. In the present exemplary embodiment, calculation of intrinsic paper white portion and highlight information that is not influenced by the surface irregularities is defined as "estimation". Details of the processing of estimating signal values of the paper white portion and the highlights will be described below. The highlights mentioned herein correspond to high luminance areas close to the paper white portion.

Subsequently, in step S407, the CPU 103 causes the display device 118 to display a UI indicating that the paper white portion and the highlights are estimated. Finally, in step S408, the CPU 103 performs the calibration processing. In the calibration processing, the CPU 103 compares the average signal value of the scanned tone chart and a target value that is stored in advance, and then generates a 1D-LUT to minimize a difference between the average signal value and the target value. The CPU 103 may skip the processing in step S407, i.e., may execute the processing in step S408 right after executing the processing in step S406.

In a case of determining that the signal values are not influenced by the surface irregularities of the paper (NO in step S405), the CPU 103 performs the calibration processing in step S408 without performing the processing in steps S406 to S407.

While the printer 115 outputs the tone chart in step S401 and the scanner 119 reads the tone chart in step S402 in the flowchart illustrated in FIG. 4, the processing in step S401 may be skipped and the scanner 119 may read a white sheet of paper in step S402. In the processing in steps S403 to S406, the CPU 103 may perform the processing of estimating a signal value of the white sheet by determining an average signal value of white sheet data and variance of the signal values. In this case, the CPU 103 performs none of the acquisition of an average signal value of the patches, the determination of variance of signal values of the patches, and the processing of estimating signal values of the highlights.

Figure 7:
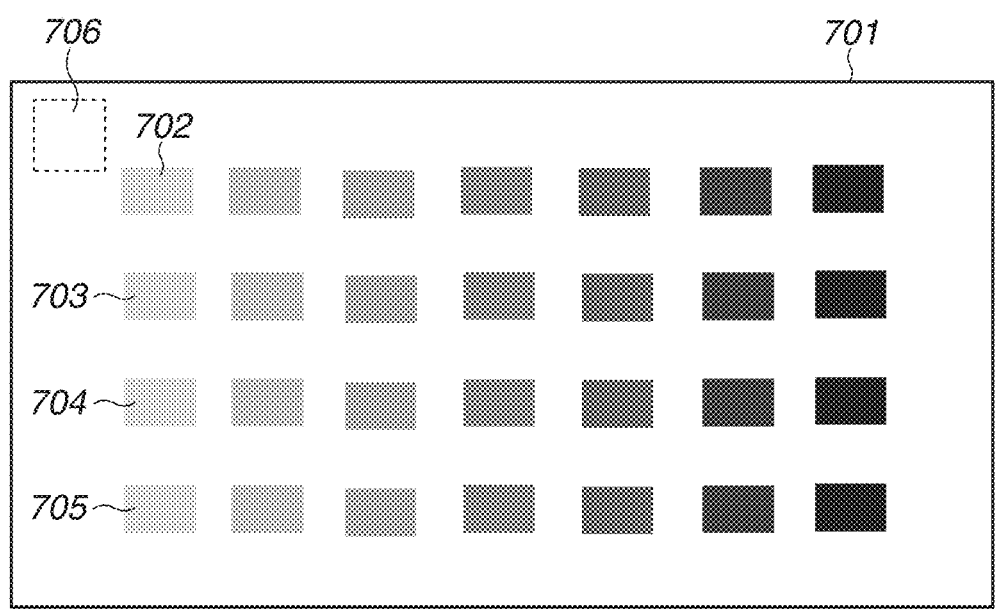
FIG. 7 is a diagram illustrating an example of a chart according to the first exemplary embodiment.

Subsequently, the tone chart will be described with reference to FIG. 7. In a tone chart 701, patches 702 to 705 are arranged, and respective pieces of tone data subsequent to the patches 702 to 705 are arranged on the right side thereof. The patches 702 to 705 and the subsequent tone data arranged on the right side thereof correspond to colors of C, M, Y, and K, respectively, from the top to the bottom. A blank portion 706 is a non-printed area, and is used for calculating a signal value of a white sheet of paper.

Figure 5:
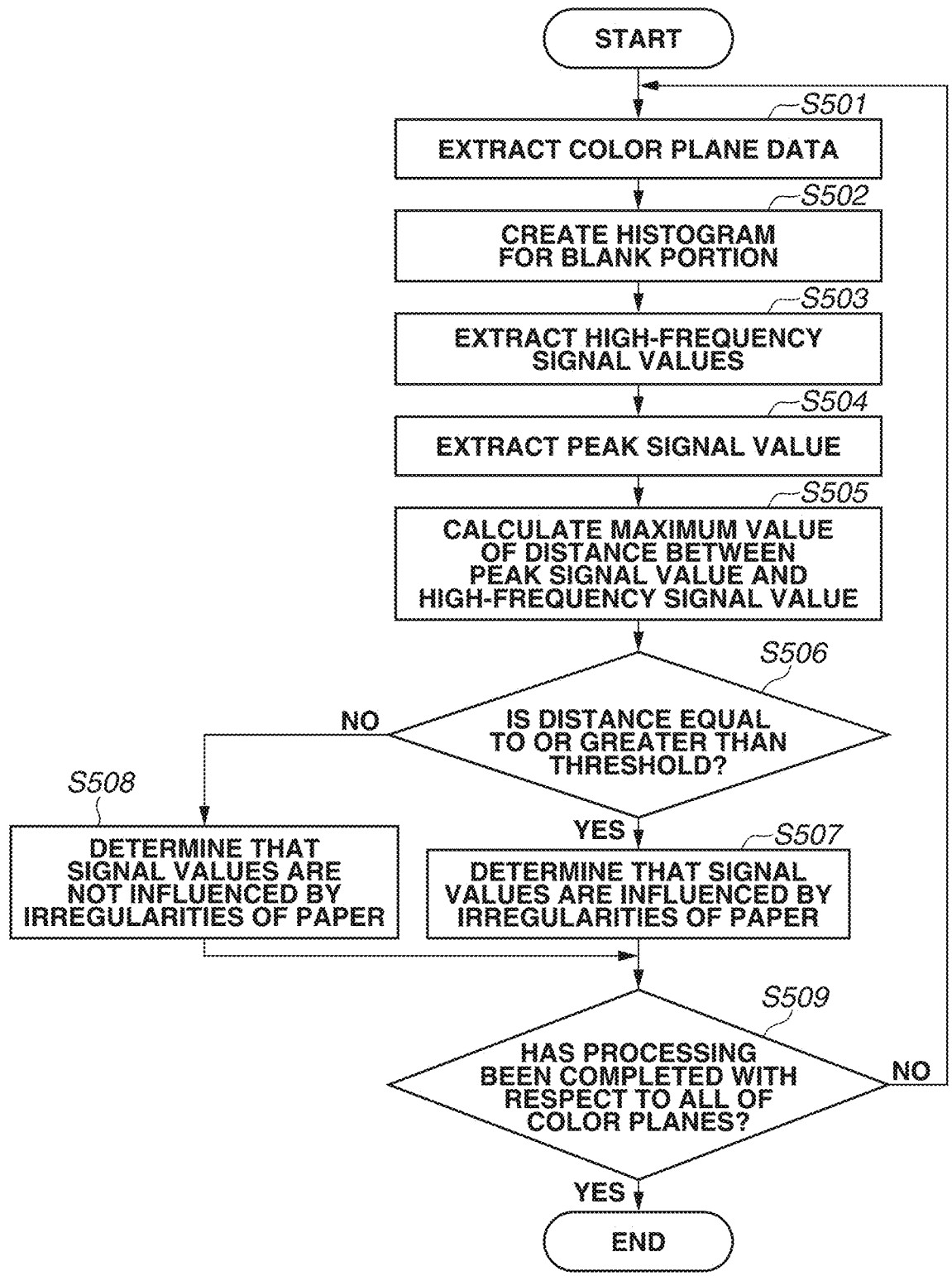
FIG. 5 is a flowchart of processing of determining influence of irregularities of paper according to the first exemplary embodiment.

The processing of determining an influence of the surface irregularities of the paper will be described with reference to FIG. 5. The flow of the following processing in steps S501 to S509 is implemented by the CPU 103 included in the controller 102. A program for implementing the flowchart illustrated in FIG. 5 is stored in the storage device 121, loaded into the RAM (not illustrated), and executed by the CPU 103.

In step S501, the CPU 103 extracts a color plane from the scan data of the tone chart. In the present exemplary embodiment, since RGB image data is to be acquired, so that the CPU 103 extracts any of the R, G, and B color planes in this step.

In step S502, the CPU 103 creates a histogram for the blank portion 706. The CPU 103 creates the histogram from signal values of pixels in the blank portion 706. In step S503, the CPU 103 extracts highly frequent signal values in the histogram. In step S504, the CPU 103 extracts a peak signal value in the histogram.

In step S505, the CPU 103 calculates a distance between the peak signal value and each of the highly frequent signal values, and calculates a maximum value among the distances. In step S506, the CPU 103 compares the maximum distance value calculated in step S506 to a threshold. In a case where the maximum value is equal to or greater than the threshold (variance is large) (YES in step S506), the processing proceeds to step S507. In step S507, the CPU 103 determines that the signal values are influenced by the surface irregularities of the paper.

In a case where the maximum value is less than the threshold (variance is small) (NO in step S506), the processing proceeds to step S508. In step S508, the CPU determines that the signal values are not influenced by the surface irregularities of the paper. In step S509, the CPU 103 determines whether the processing has been completed with respect to all of the color planes. In a case where any of the color planes has not been processed (NO in step S509), the processing returns to step S501, in which the CPU 103 extracts any remaining color plane and repeats the processing thereon.

In a case where the CPU 103 determines that the processing has been completed with respect to all of the color planes (YES in step S509), the processing ends.

Figure 9A:
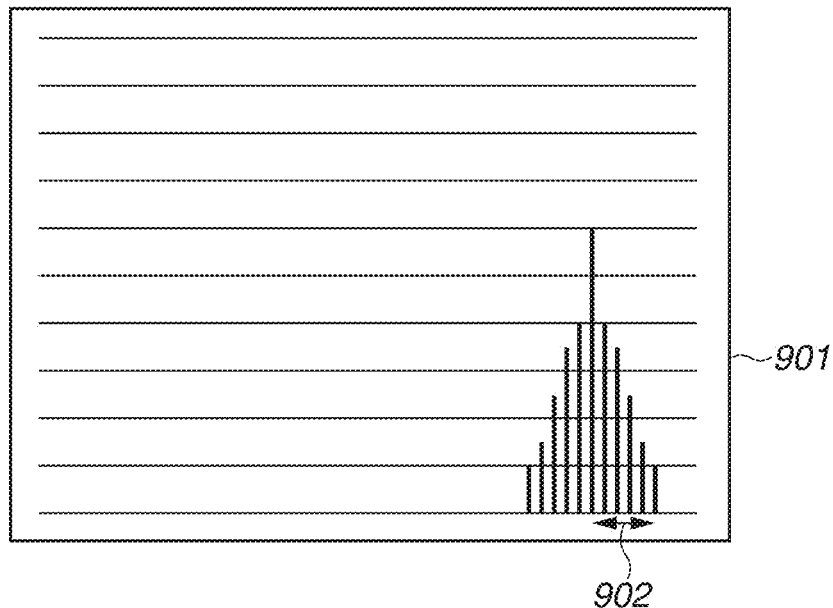
FIGS. 9A and 9B are diagrams each illustrating an example of a histogram according to the first exemplary embodiment.
Figure 9B:
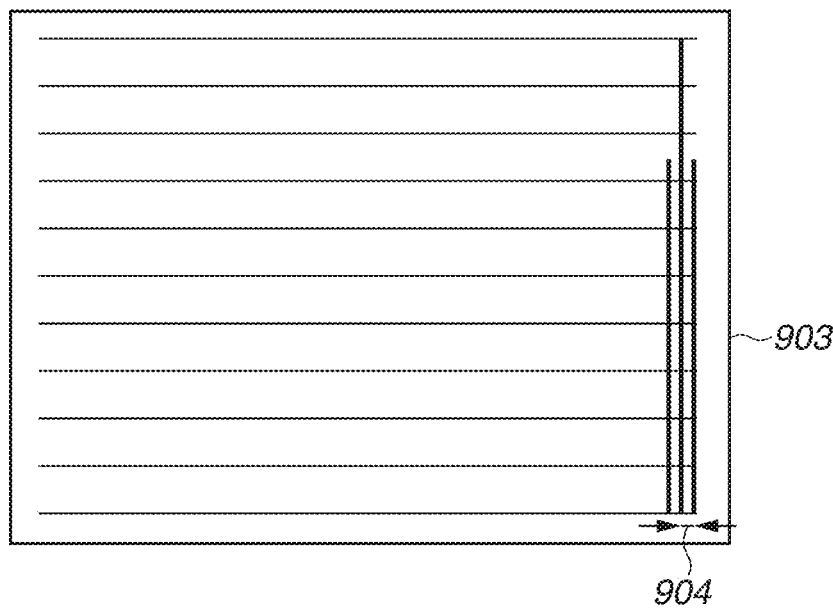

An example of the histogram will be described with reference to FIGS. 9A and 9B. A histogram 901 in FIG. 9A is an example in which shadows are generated due to the influence of the surface irregularities of the paper. A histogram 903 in FIG. 9B is an example in which the signal values are not influenced by the surface irregularities of the paper. An ordinate axis of each histogram represents a frequency, an abscissa axis thereof represents a luminance signal value (a signal value of any of R, G, and B signals). The higher the frequency is, the larger the numeric value on the ordinate axis becomes. Signal values on the left side of the abscissa axis indicate values of dark signals. Signal values on the right side of the abscissa axis indicate values of bright signals.

In the example illustrated in FIG. 9A, the change amount of the signal values of the blank portion is large due to the generated shadows. Hence, the distribution of the histogram 901 is spread out, thereby increasing a distance 902 from the peak signal value.

In contrast, since no shadow is generated in the example in FIG. 9B, the change amount of the signal values of the blank portion is small. Hence, the distribution of the histogram 903 is narrowed, so that a distance 904 from the peak signal value is small.

Figure 6:
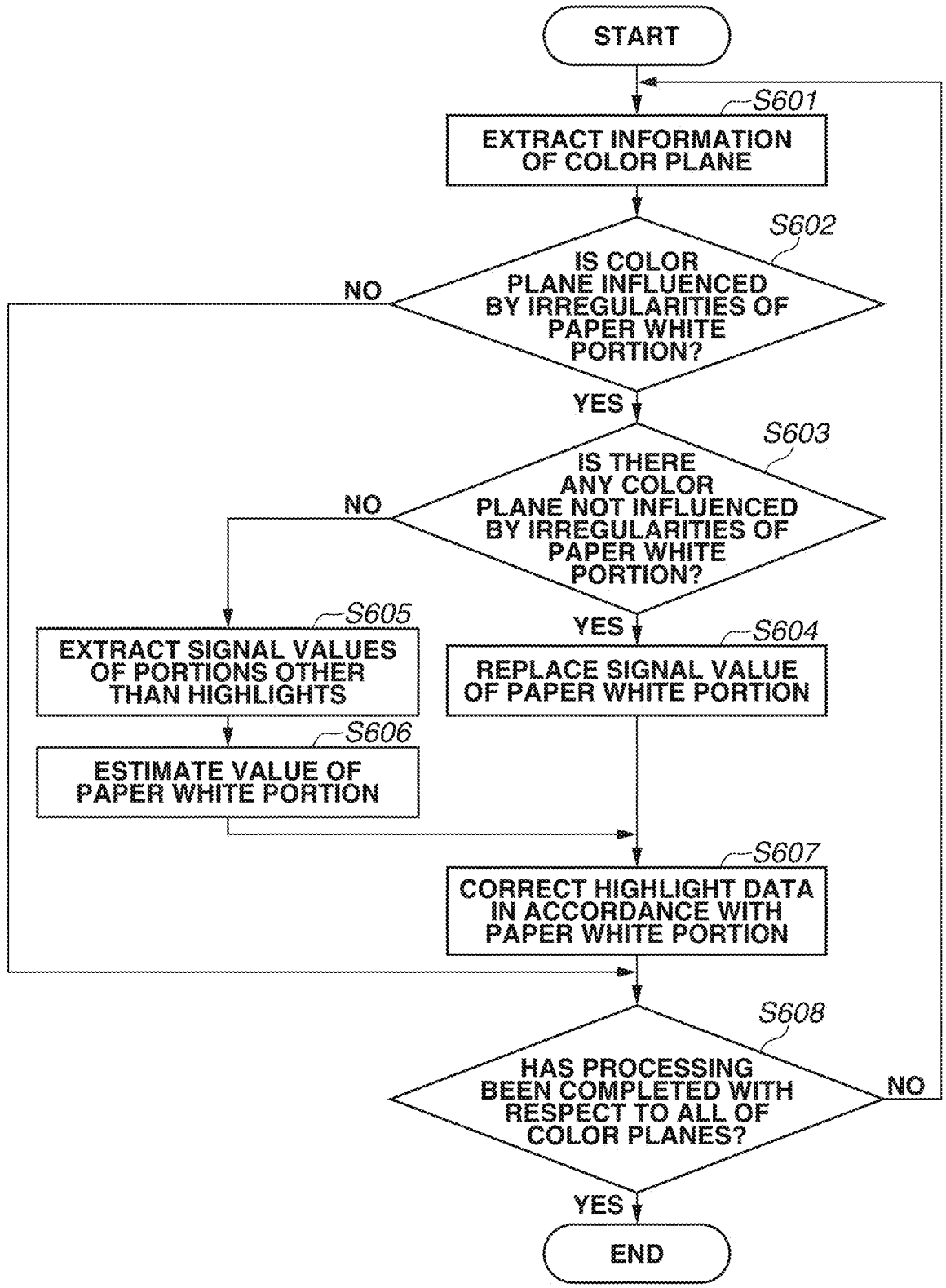
FIG. 6 is a flowchart illustrating processing of estimating signal values of paper white and highlights according to the first exemplary embodiment.

A description will be given of the processing of estimating signal values of a paper white portion and highlights with reference to FIG. 6.

The flow of the following processing in steps S601 to S608 is implemented by the CPU 103 included in the controller 102. A program for implementing the flowchart illustrated in FIG. 6 is stored in the storage device 121, loaded into the RAM (not illustrated), and executed by the CPU 103.

In step S601, the CPU 103 extracts information on a color plane. In this processing, the CPU 103 extracts information on any of the R, G, and B color planes from the average signal values calculated in step S403 and the result of the processing of determining the influence of the surface irregularities of the paper performed in step S404.

In step S602, the CPU 103 determines whether the extracted color plane is influenced by the surface irregularities of the paper white portion. In a case where the color plane is influenced by the surface irregularities of the paper white portion (YES in step S602), the processing proceeds to step S603. In step S603, the CPU 103 determines whether there is any other color plane that is not influenced by the surface irregularities of the paper white portion. In a case where the extracted color plane is not influenced by the surface irregularities of the paper white portion (NO in step S602), the CPU 103 performs processing in step S608 or a subsequent step without performing processing in steps S603 to S607.

In a case where there is another color plane that is not influenced by the surface irregularities of the paper white portion (YES in step S603), the processing proceeds to step S604. In step S604, the CPU 103 performs processing of correcting a signal value (luminance value) of the paper white portion (white area). In this processing, the CPU 103 replaces a signal value of the paper white portion of the color plane that is influenced by the surface irregularities with a signal value of the paper white portion of the color plane that is not influenced by the irregularities.

In a case where there is no other color plane that is not influenced by the surface irregularities of the paper white portion (NO in step S603), the processing proceeds to step S605. In step S605, the CPU 103 extracts signal values of portions other than the highlights. In step S606, the CPU 103 estimates a value of the paper white portion using the signal values of the portions other than the highlights. Details of the estimation of the paper white portion will be described below.

In step S607, the CPU 103 corrects highlight data in accordance with the estimated value of the paper white portion. In this processing, the CPU 103 calculates a signal value of the highlight data by performing an interpolation operation using the estimated value of the paper white portion and the signal values of portions other than the highlights.

In step S608, the CPU 103 determines whether the processing has been completed with respect to all of the color planes. In a case where the processing has not been completed with respect to all of the color planes (NO in step S608), the CPU 103 extracts information on another color plane in step S601 and repeats the processing. In a case where the processing has been completed with respect to all of the color planes (YES in step S608), the processing ends. In the execution of the processing of the flowchart in FIG. 6, if correction is made to the paper white data and the highlight data in steps S604, S606, and S607, the CPU 103 performs the calibration processing using the corrected paper white portion and highlight data in step S408 in FIG. 4.

The processing of estimating the signal value of the paper white portion will be described below with reference to FIGS. 10A and 10B.

Figure 10A:
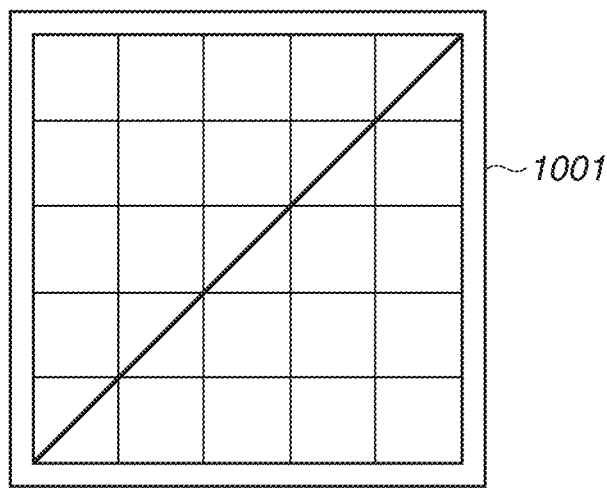
FIGS. 10A and 10B are diagrams each illustrating an example of signals obtained by reading a chart.
Figure 10B:
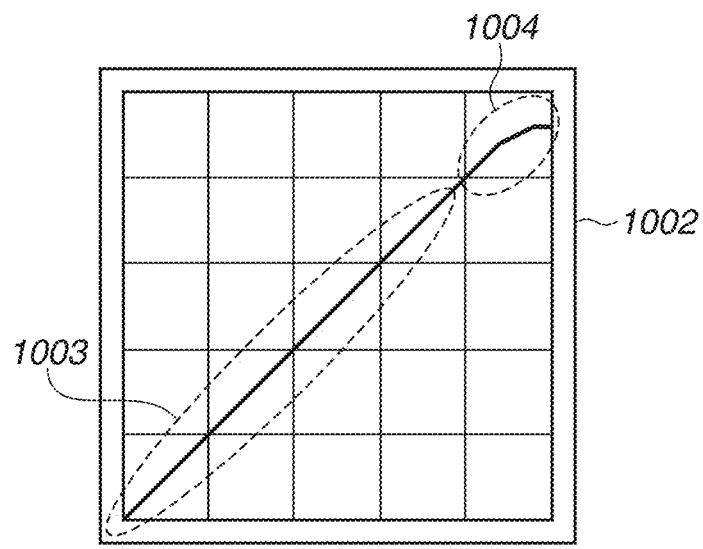

FIGS. 10A and 10B are graphs each illustrating a change of the average signal value acquired from the tone chart 701. Each graph indicates a change of the average signal value of patches of C, M, Y, or K. Signal values on the left side of each graph are average signal values of dark color patches, and signal values on the right side of each graph are average signal values of light color patches. A signal value on the rightmost end of each graph is an average signal value of the blank portion.

A graph 1001 in FIG. 10A illustrates an example of a change of the average signal value of patches when the signal values are not influenced by the surface irregularities of the paper. A graph 1002 in FIG. 10B illustrates an example of a change of the average signal value of patches when the signal values are influenced by the surface irregularities of the paper. Since the signal values are influenced by the surface irregularities, the average signal value of the blank portion is different from that in the graph 1001. Additionally, the whole of highlight data 1004 is influenced by the surface irregularities of the blank portion of the paper, and thus values of the highlight data 1004 are different from corresponding values in the graph 1001.

Since data 1003 is data of the portions other than the highlights, the data 1003 is less susceptible to the influence by reproduction of the surface irregularities of the paper and represents an average signal value that is almost the same as that in the graph 1001. In steps S604 to S607, the CPU 103 performs the estimation processing on the highlight data 1004. Specifically in step S606, the CPU 103 estimates a value of the paper white portion using the data 1003 of the portions other than the highlights.

Figure 11:
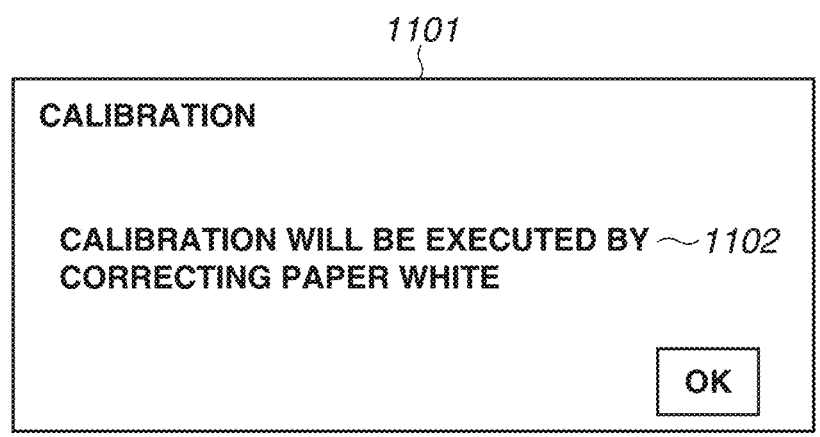
FIG. 11 is a diagram illustrating an example of a user interface (UI) according to the first exemplary embodiment.

FIG. 11 illustrates an example of a UI 1101 displayed in step S407. The UI 1101 displays a message 1102 that indicates execution of the calibration processing by correcting the signal value of the paper white portion.

While it is determined whether the signal values are influenced by the surface irregularities of the paper using the histogram in the present exemplary embodiment, any means may be used as long as it presents information regarding distribution of signal values of the blank portion. A method using an average value and a variance value will be described below in another exemplary embodiment.

While the present exemplary embodiment uses information on the other color planes at the time of estimating the signal values of the paper white portion and highlights, the CPU 103 may perform only processing of estimating the signal values from data of the portions other than the highlights without using the information on the other color planes.

While the description has been given of the example of estimating the signal values of the paper white portion and highlights in the present exemplary embodiment, the CPU 103 may indicate that accuracy of correction may deteriorate under the influence of the surface irregularities of paper and then perform processing of canceling correction.

While the description has been given of the case of estimating the signal value of the paper white portion under the influence of the surface irregularities of the paper in the present exemplary embodiment, the CPU 103 may indicate that an influence on the accuracy of correction increases in a case where the signal value of the paper white portion changes significantly as a result of the estimation, and then perform processing of canceling correction.

According to the present exemplary embodiment, it is determined whether a paper white portion is read correctly, and a signal value of the paper white portion is correctly estimated using a result of the determination, so that the present exemplary embodiment can prevent a decrease in accuracy of calibration.

In the first exemplary embodiment, a histogram is used to determine surface irregularities of paper. In a second exemplary embodiment, a description will be given of an example of using an average value and a variance value to determine surface irregularities of paper. An average signal value of the paper under the influence of the surface irregularities of the paper, an average signal value of the paper changes from an intrinsic average signal value that is supposed to be obtained due to the influence of shadows. Furthermore, data becomes non-uniform, thereby increasing a variance value of the blank portion. In the present exemplary embodiment, determination processing is performed using this feature.

Figure 12:
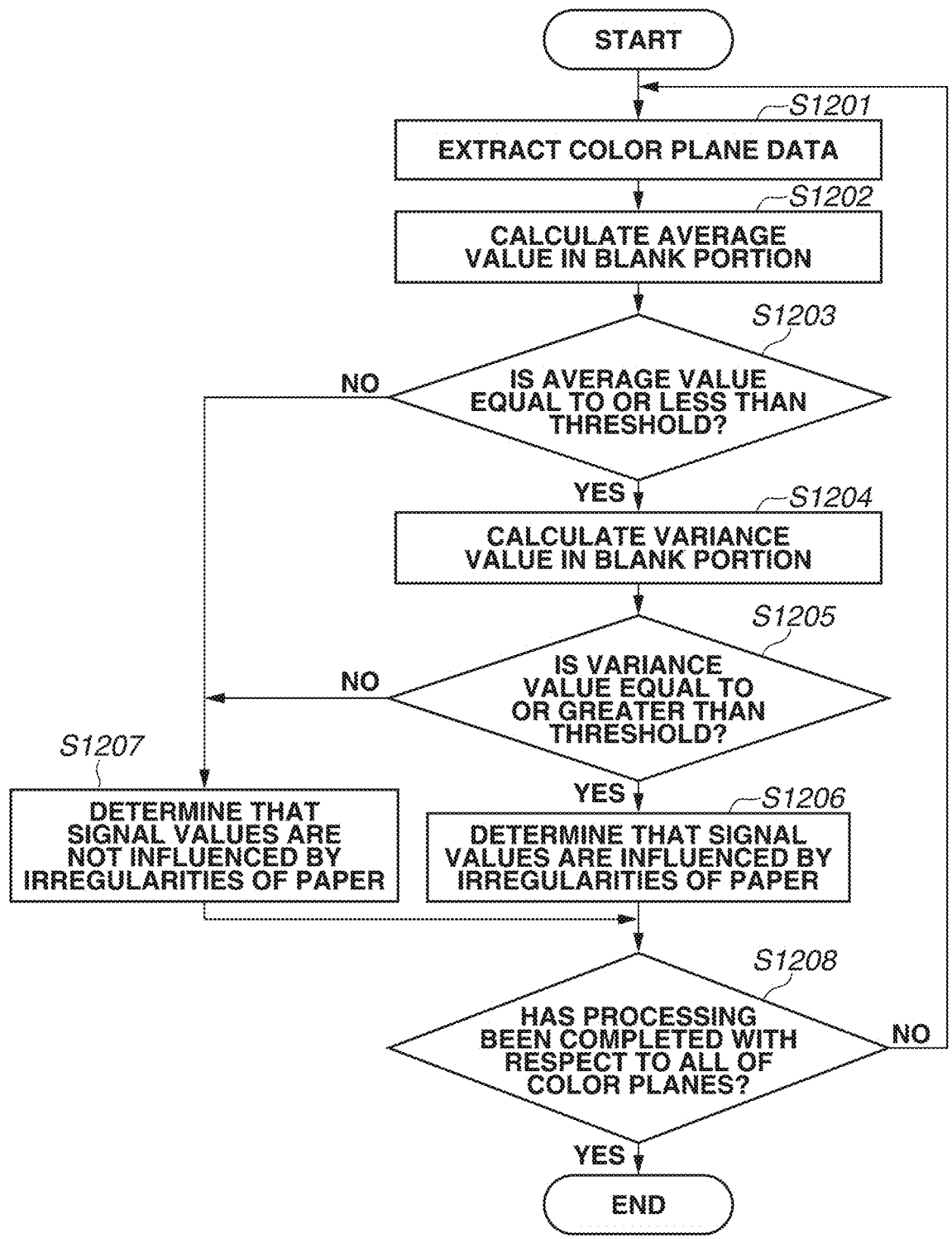
FIG. 12 is a flowchart illustrating processing of determining influence of irregularities of paper according to a second exemplary embodiment.

Processing of determining an influence of surface irregularities of paper according to the present exemplary embodiment will be described with reference to FIG. 12.

The flow of the following processing in steps S1201 to S1208 is implemented by the CPU 103 included in the controller 102. A program for implementing a flowchart illustrated in FIG. 12 is stored in the storage device 121, loaded into the RAM (not illustrated), and executed by the CPU 103.

In step S1201, the CPU 103 extracts color plane data similarly to the processing in step S501. In step S1202, the CPU 103 calculates an average value of the blank portion from the extracted color plane data. In step S1203, the CPU 103 determines whether the average value of the blank portion is equal to or less than a threshold. In a case where the average value of the blank portion is greater than the threshold (NO in step S1203), the processing proceeds to step S1207. In step S1207, the CPU 103 determines that the signal values are not influenced by the surface irregularities of the paper.

In a case where the average value of the blank portion is equal to or less than the threshold (YES in step S1203), the processing proceeds to step S1204. In step S1204, the CPU 103 calculates a variance value of the blank portion. In step S1205, the CPU 103 determines whether the variance value of the blank portion is equal to or greater than the threshold. In a case where the variance value in the blank portion is less than the threshold (NO in step S1205), the processing proceeds to step S1207. In step S1207, the CPU 103 determines that the signal values are not influenced by the surface irregularities of the paper.

In a case where the CPU 103 determines that the variance value of the blank portion is equal to or greater than the threshold (YES in step S1205), the processing proceeds to step S1206. In step 1206, the CPU 103 determines that the signal values are influenced by the surface irregularities of the paper.

In step S1208, the CPU 103 determines whether the processing has been completed with respect to all of the color planes. In a case where there is a color plane that has not been processed (NO in step S1208), the processing returns to step S1201, in which the CPU 103 extracts a remaining color plane and repeats the processing thereon. In a case where the CPU 103 determines that the processing has been completed with respect to all of the color planes (YES in step S1208), the processing ends.

While the present exemplary embodiment uses both of the average value and the variance value, the determination may be made by using only the variance value.

According to the present exemplary embodiment, it is determined whether a paper white portion is read correctly and a signal value of the paper white portion is correctly estimated using a result of the determination, so that the present exemplary embodiment can prevent a decrease in accuracy of calibration In the first and second exemplary embodiments, to estimate the signal values of the paper white portion and highlights, the information on other color planes and the data on portions other than the highlights are used.

In a third exemplary embodiment, a description will be given of an example of using a histogram in estimating signal values of a paper white portion and highlights. In a case where signal values are influenced by the surface irregularities of the paper, the distribution of the histogram is spread out. In the present exemplary embodiment, estimation processing is performed using this feature.

Figure 13:
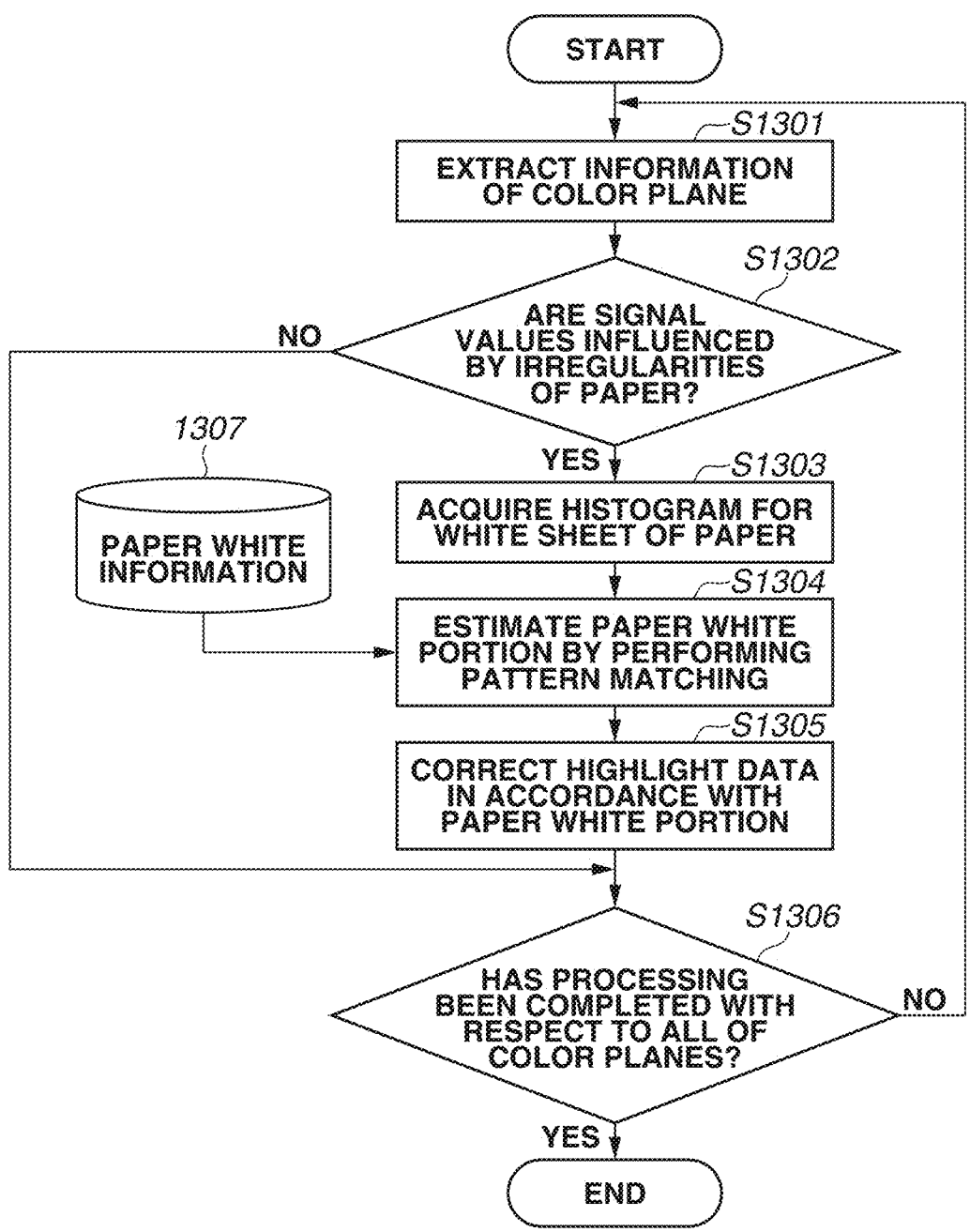
FIG. 13 is a flowchart illustrating processing of estimating signal values of paper white and highlights according to a third exemplary embodiment.

Processing of estimating the signal values of the paper white and highlights according to the present exemplary embodiment will be described with reference to FIG. 13. A program for implementing a flowchart illustrated in FIG. 13 is stored in the storage device 121, loaded into the RAM (not illustrated), and executed by the CPU 103.

The flow of the following processing in steps S1301 to S1306 is implemented by the CPU 103 included in the controller 102. In step S1301, the CPU 103 extracts information on a color plane similarly to the processing in step S601. In step S1302, the CPU 103 determines whether signal values are influenced by the surface irregularities of the paper from the extracted color plane. In a case where the CPU 103 determines that the signal values are not influenced by the surface irregularities of the paper (NO in step S1302), the processing proceeds to step S1306.

In a case where the CPU 103 determines that the signal values are influenced by the irregularities of the paper (YES in step S1302), the processing proceeds to step S1303. In step S1303, the CPU 103 acquires a histogram for a white sheet of paper. In this processing, the CPU 103 uses the histogram calculated in the processing of determining the influence of the surface irregularities of the paper in step S404. In step S1304, the CPU 103 performs pattern matching of the shape of the histogram using paper white information 1307, and estimates an intrinsic value of the paper white portion that is supposed to be obtained. The paper white information 1307 is information obtained by associating a histogram for the paper white portion of the paper with the intrinsic signal value of the paper white portion that is supposed to be obtained. The paper white information 1307 is created in advance and stored in the storage device 121. The CPU 103 compares the shape of the histogram of the paper white information 1307 and a histogram for the extracted color plane, and reads out paper white portion that is associated with a histogram that has the closest shape to that of the histogram of the paper white information 1307.

In step S1305, the CPU 103 corrects highlight data in accordance with the estimated paper white value similarly to step S607. In step S1306, the CPU 103 determines whether the processing has been completed with respect to all of the color planes. In a case where there is a color plane that has not been processed (NO in step S1306), the processing returns to S1301, in which the CPU 103 extracts a remaining color plane and repeats the processing thereon. In a case where the processing has been completed with respect to all of the color planes (YES in step S1306), the processing ends.

While a corresponding paper white value is estimated from paper white information using a histogram in the present exemplary embodiment, any information may be used as long as it indicates distribution of signal values of a blank portion such as a variance value.

According to the present exemplary embodiment, it is determined whether a paper white portion is read correctly and a signal value of the paper white portion is correctly estimated using a result of the determination, so that the present exemplary embodiment can prevent a decrease in accuracy of calibration.

According to the present disclosure, a luminance value of a white area that cannot be read correctly is corrected by calibration, so that the present disclosure can prevent a decrease in accuracy of calibration.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, circuitry, or combinations thereof (e.g., central processing unit (CPU), micro processing unit (MPU)), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2020-098732, filed Jun. 5, 2020, which is hereby incorporated by reference herein in its entirety.

What is claimed is:

1. An image forming apparatus comprising:
   an output unit configured to output a tone chart including a white area;

a reading unit configured to read the tone chart output by the output unit;

a determination unit configured to determine variance of luminance of the white area of the tone chart read by the reading unit;

a luminance value correction unit configured to correct a luminance value of the white area of the tone chart read by the reading unit based on a result of the determination made by the determination unit; and a tone correction unit configured to perform tone correction using the luminance value of the white area corrected by the luminance value correction unit.

2. The image forming apparatus according to claim 1, wherein the determination unit is configured to determine the variance of the luminance for each of color planes of red (R), green (G), and blue (B).

3. The image forming apparatus according to claim 1, wherein the determination unit is configured to determine the variance of the luminance using a histogram for the white area.

4. The image forming apparatus according to claim 3, wherein the determination unit is configured to determine the variance of the luminance using a distance between a peak luminance value and a highly-frequent luminance value in the histogram for the white area.

5. The image forming apparatus according to claim 1, wherein the determination unit is configured to use an average value of the luminance of the white area.

6. The image forming apparatus according to claim 1, wherein the determination unit is configured to use a variance value of the luminance of the white area.

7. The image forming apparatus according to claim 1, wherein the luminance value correction unit is configured to correct the luminance value of the white area based on a luminance value of an area other than the white area.

8. The image forming apparatus according to claim 1, wherein the luminance value correction unit is configured to correct the luminance value of the white area based on a luminance value of an area other than a highlight area.

9. The image forming apparatus according to claim 1, wherein the luminance value correction unit is configured to acquire previously associated paper white information using a histogram for the white area or the variance of the luminance of the white area.

10. A control method of an image forming apparatus, the method comprising:

outputting a tone chart including a white area;

reading the output tone chart;

determining variance of luminance of the white area of the read tone chart;

correcting a luminance value of the white area of the read tone chart based on a result of the determining; and performing tone correction using the corrected luminance value of the white area.

* * * * *